United States Patent
Lei et al.

(10) Patent No.: US 12,019,341 B2
(45) Date of Patent: Jun. 25, 2024

(54) ARRAY SUBSTRATE AND DISPLAY PANEL

(71) Applicants: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

(72) Inventors: Yong Lei, Huizhou (CN); Meifa Peng, Huizhou (CN)

(73) Assignees: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/623,256

(22) PCT Filed: Nov. 17, 2021

(86) PCT No.: PCT/CN2021/131276
§ 371 (c)(1),
(2) Date: May 19, 2023

(87) PCT Pub. No.: WO2023/082300
PCT Pub. Date: May 19, 2023

(65) Prior Publication Data
US 2024/0036416 A1      Feb. 1, 2024

(30) Foreign Application Priority Data
Nov. 10, 2021 (CN) .......................... 202111328820.X (51) Int. Cl.
*G02F 1/1362* (2006.01)

(52) U.S. Cl.
CPC ............................. *G02F 1/136286* (2013.01)

(58) Field of Classification Search
CPC ..................................... G02F 1/1362
See application file for complete search history.

(56) References Cited

U.S. PATENT DOCUMENTS

2013/0114032 A1* 5/2013 Chen ................. G02F 1/13439
349/149
2014/0347319 A1 11/2014 Lin et al.
(Continued)

FOREIGN PATENT DOCUMENTS

| CN | 104252071 A | 12/2014 |
| CN | 104714327 A | 6/2015 |

(Continued)

OTHER PUBLICATIONS

Chinese Decision of Rejection issued in corresponding Chinese Patent Application No. 202111328820.X dated Nov. 1, 2023, pp. 1-6.
International Search Report in International application No. PCT/CN2021/131276, mailed on Jul. 28, 2022.
(Continued)

*Primary Examiner* — Sang V Nguyen
(74) *Attorney, Agent, or Firm* — PV IP PC; Wei Te Chung; Zhigang Ma (57) ABSTRACT

An array substrate and a display panel are disclosed. In the array substrate, array electrodes of at least a portion of pixel units that are adjacent to a base plate edge have areas that are gradually decreased from a base plate center toward the base plate edge. The portion of the array electrodes gradually decreased are arranged in a region of a display panel in which the brightness is relatively bright. If the areas of the array electrodes are decreased, the aperture ratios of the pixel units are reduced. After the aperture ratios of the pixel units are reduced, light transmission rate in an edge zone of the array substrate can be lowered. As such, the portion of the base plate edge of which light is relatively bright is made (Continued)

corresponding to the brightness of the base plate center, thereby realizing the improvement on the nonuniformity of periphery displaying.

18 Claims, 4 Drawing Sheets

(56) References Cited

U.S. PATENT DOCUMENTS

| | | | |
|---|---|---|---|
| 2016/0231853 A1* | 8/2016 | Weng | G06F 3/0443 |
| 2016/0328074 A1* | 11/2016 | Peng | G06F 3/0412 |
| 2017/0299908 A1* | 10/2017 | Peng | G02F 1/13338 |
| 2020/0332592 A1* | 10/2020 | Mun | G02F 1/13454 |
| 2022/0035207 A1* | 2/2022 | Meng | G02F 1/134345 |

FOREIGN PATENT DOCUMENTS

| | | |
|---|---|---|
| CN | 104808403 A | 7/2015 |
| CN | 105988614 A | 10/2016 |
| CN | 106338862 A | 1/2017 |
| CN | 110412801 A | 11/2019 |
| CN | 111221188 A | 6/2020 |
| CN | 111352267 A | 6/2020 |
| CN | 112786640 A | 5/2021 |

OTHER PUBLICATIONS

Written Opinion of the International Search Authority in International application No. PCT/CN2021/131276, mailed on Jul. 28, 2022.
Chinese Office Action issued in corresponding Chinese Patent Application No. 202111328820.X dated Apr. 8, 2023, pp. 1-6.

* cited by examiner

ARRAY SUBSTRATE AND DISPLAY PANEL

FIELD OF INVENTION

The present invention relates to the field of display technology, and more particularly to an array substrate and a display panel.

BACKGROUND OF INVENTION

A conventional liquid crystal panel primarily includes an array substrate, a color filter substrate, and liquid crystal interposed between the array substrate and the color filter substrate. With the increasing expansion of the field of application for the liquid crystal displays, the requirement for reliability of the liquid crystal displays gets increasingly severe. Currently, the conditions for high temperature high humanity operation (HTHHO) are changed to test for 500 hours at a temperature of 60° C. and a humidity of 90% RH, and as such, the requirement for the panels are severer.

During research and practice of the current technology, the applicant notices in the HTHHO reliability test of 60° C. and 90% RH, mura occurs on a periphery of the display panel and is specifically realized as a peripheral location being brighter than a central location, thereby affecting the quality of the panel.

SUMMARY OF INVENTION

Embodiments of the present invention provide an array substrate and a display panel to improve nonuniformity of periphery displaying of a display panel.

Embodiments of the application provide an array substrate, which comprises:
- a base plate, the base plate being provided thereon with multiple pixel units; and
- multiple array electrodes, at least one of the array electrodes being correspondingly arranged in one of the pixel units, wherein in pixel units that are arranged in a direction from a base plate center toward a base plate edge, array electrodes corresponding to at least a portion of the pixel units have areas that are gradually decreased in the arrangement direction.

Optionally, in some embodiments of the application, the array substrate comprises a first display sub-zone and a second display sub-zone, the second display sub-zone being arranged on at least one side of the first display sub-zone; in the second display sub-zone, array electrodes corresponding to different ones of the pixel units have areas that are gradually decreased from the base plate center toward a second display sub-zone edge.

Optionally, in some embodiments of the application, the second display sub-zone is at least arranged on a first side and a second side of the first display sub-zone, the first side and the second side mutually intersecting; in the second display sub-zone arranged on the first side, array electrodes corresponding to different ones of the pixel units have areas that are gradually decreased from the base plate center toward the first side, and in the second display sub-zone arranged on the second side, array electrodes corresponding to different ones of the pixel units have areas that are gradually decreased from the base plate center toward the second side.

Optionally, in some embodiments of the application, the second display sub-zone has a width ranging from 10 millimeters to 200 millimeters.

Optionally, in some embodiments of the application, in at least a portion of the pixel units that are adjacent to the base plate edge, array electrodes corresponding to different ones of the pixel units have widths that are identical and lengths of the array electrodes are gradually decreased from the base plate center toward the base plate edge.

Optionally, in some embodiments of the application, in at least a portion of the pixel units that are adjacent to the base plate edge, the lengths of the array electrodes in the pixel units are gradually decreased from the base plate center toward the base plate edge by a difference between 0.1 micrometers and 0.5 micrometers.

Optionally, in some embodiments of the application, in at least a portion of the pixel units that are adjacent to the base plate edge, array electrodes corresponding to different ones of the pixel units have lengths that are identical and widths of the array electrodes are gradually decreased from the base plate center toward the base plate edge.

Optionally, in some embodiments of the application, in at least a portion of the pixel units that are adjacent to the base plate edge, the widths of the array electrodes in the pixel units are gradually decreased from the base plate center toward the base plate edge by a difference between 0.1 micrometers and 0.5 micrometers.

Optionally, in some embodiments of the application, in at least a portion of the pixel units that are adjacent to the base plate edge, array electrodes corresponding to different ones of the pixel units have lengths and widths that are both gradually decreased from the base plate center toward the base plate edge.

Optionally, in some embodiments of the application, in at least a portion of the pixel units that are adjacent to the base plate edge, the length and the widths of the array electrodes in the pixel units are both gradually decreased from the base plate center toward the base plate edge by a difference between 0.1 micrometers and 0.5 micrometers.

Optionally, in some embodiments of the application, in at least a portion of the pixel units that are adjacent to the base plate edge, the length and/or the widths of the array electrodes in the pixel units are gradually decreased from the base plate center toward the base plate edge by a difference between 0.1 micrometers and 0.5 micrometers.

Optionally, in some embodiments of the application, the array substrate further comprises an insulation layer, the insulation layer being arranged on the base plate, the array electrodes being arranged on one side of the insulation layer that is away from the base plate.

Correspondingly, embodiments of the application also provide a display panel, which comprises:
- an array substrate, the array substrate comprising:
  - a base plate, the base plate being provided thereon with multiple pixel units; and
  - multiple array electrodes, at least one of the array electrodes being correspondingly arranged in one of the pixel units, wherein in pixel units that are arranged in a direction from a base plate center toward a base plate edge, array electrodes corresponding to at least a portion of the pixel units have areas that are gradually decreased in the arrangement direction;
- an opposite substrate, the opposite substrate and the array substrate being arranged opposite to each other; and
- a liquid crystal layer, the liquid crystal layer being arranged between the array substrate and the opposite substrate.

The array substrate comprises a first display sub-zone and a second display sub-zone, the second display sub-zone being arranged on at least one side of the first display sub-zone; in the second display sub-zone, array electrodes corresponding to different ones of the pixel units have areas that are gradually decreased from the base plate center toward a second display sub-zone edge.

Optionally, in some embodiments of the application, the second display sub-zone is at least arranged on a first side and a second side of the first display sub-zone, the first side and the second side mutually intersecting; in the second display sub-zone arranged on the first side, array electrodes corresponding to different ones of the pixel units have areas that are gradually decreased from the base plate center toward the first side, and in the second display sub-zone arranged on the second side, array electrodes corresponding to different ones of the pixel units have areas that are gradually decreased from the base plate center toward the second side.

Optionally, in some embodiments of the application, the second display sub-zone has a width ranging from 10 millimeters to 200 millimeters.

Optionally, in some embodiments of the application, in at least a portion of the pixel units that are adjacent to the base plate edge, array electrodes corresponding to different ones of the pixel units have widths that are identical and lengths of the array electrodes are gradually decreased from the base plate center toward the base plate edge.

Optionally, in some embodiments of the application, in at least a portion of the pixel units that are adjacent to the base plate edge, the lengths of the array electrodes in the pixel units are gradually decreased from the base plate center toward the base plate edge by a difference between 0.1 micrometers and 0.5 micrometers.

Optionally, in some embodiments of the application, in at least a portion of the pixel units that are adjacent to the base plate edge, array electrodes corresponding to different ones of the pixel units have lengths that are identical and widths of the array electrodes are gradually decreased from the base plate center toward the base plate edge.

1 Optionally, in some embodiments of the application, in at least a portion of the pixel units that are adjacent to the base plate edge, the lengths of the array electrodes in the pixel units are gradually decreased from the base plate center toward the base plate edge by a difference between 0.1 micrometers and 0.5 micrometers.

Optionally, in some embodiments of the application, in at least a portion of the pixel units that are adjacent to the base plate edge, array electrodes corresponding to different ones of the pixel units have lengths and widths that are both gradually decreased from the base plate center toward the base plate edge.

Embodiments of the application disclose an array substrate and a display panel. In the array substrate provided in the embodiments of the application, array electrodes of at least a portion of pixel units that are adjacent to a base plate edge have areas that are gradually decreased from a base plate center toward the base plate edge. In this, the portion of the array electrodes in which the areas are gradually decreased are arranged in a region of a display panel in which the brightness is relatively bright. If the areas of the array electrodes are decreased, the aperture ratios of the pixel units are reduced. After the aperture ratios of the pixel units are reduced, light transmission rate in an edge zone of the array substrate can be lowered. As such, the portion of the base plate edge of which light is relatively bright is made corresponding to the brightness of the base plate center, to thereby realize improvement on the nonuniformity of periphery displaying of the display panel.

DESCRIPTION OF DRAWINGS

To more clearly describe the technical solutions of the embodiments of the application, the following provides a brief description to the drawings that are necessary for illustrating the embodiments. Obviously, the drawings as described below illustrate only some embodiments of the application, and for those having ordinary skill in the field, other drawings may be contemplated according to the attached drawings without making creative endeavor.

DETAILED DESCRIPTION OF PREFERRED EMBODIMENTS

A clear and complete description of technical solutions of embodiments of the application will be provided below with reference to the drawings of the embodiments of the application. However, the described embodiments cover only some of the embodiments, but not all of the embodiments, of the application. Other embodiments that can be contemplated by skilled artisans of the field, without paying creative endeavor, based on the embodiments of the application are considered belonging to the scope of protection that the application is pursuing. Further, it is appreciated that the specific embodiments as described herein are provided only for illustrating and expounding the application and are not intended to limit the application. In the application, without being indicated to the contrary, direction-related terms that are used in the application, such as "up" and "down", are generally used to refer to up sides and down sides of a device in a state of actual use or operation, and are specifically the directions of a drawing sheet in the attached drawings; while "in" and "out" are applied to a contour of the device.

Embodiments of the application provide a backlight driving circuit and a liquid crystal display device. Detailed descriptions are separately provided below. It is noted that the sequence in the description of the embodiments provided below imposes no limitation to the preference ranking sequence of the embodiments.

Figure 1:
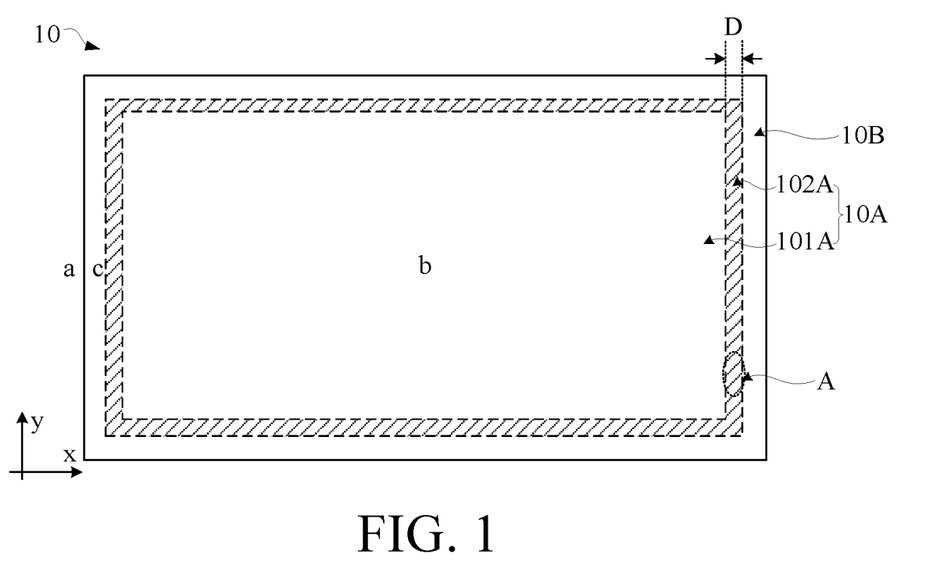
FIG. 1 is a schematic view showing a first structure of an array substrate provided in an embodiment of the application.
Figure 2:
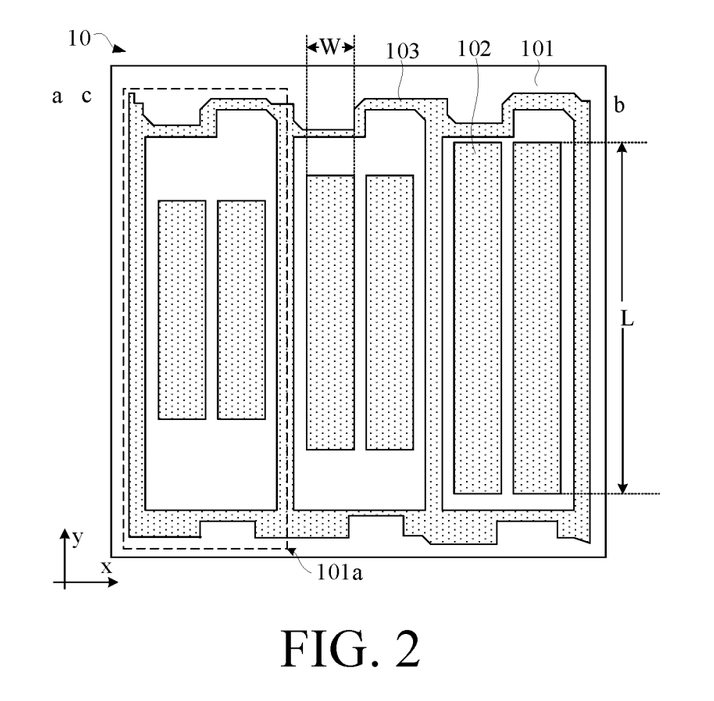
FIG. 2 is a schematic view showing, in an enlarged way, portion A of FIG. 1 provided in an embodiment of the application in a first form.

Referring to FIGS. 1 and 2, FIG. 1 is a schematic view showing a first structure of an array substrate provided in an embodiment of the application. FIG. 2 is a schematic view showing, in an enlarged way, portion A of FIG. 1 provided in an embodiment of the application in a first form. The array substrate 10 provided in an embodiment of the application comprises a base plate 101 and multiple array electrodes 102. The base plate 101 is provided with multiple pixel units 101a thereon. At least one array electrode 102 is correspondingly arranged in one pixel unit 101a. In this, in the pixel units 101a arranged from a base plate center b to a base plate edge a, the array electrodes 102 that corresponds to at least a portion of the pixel units 101a have areas that are gradually reduced in an arrangement direction.

In this, the base plate 101 can be formed of a flexible backing. In this, a material used in the flexible backing is a polymeric material, and specifically, the material used in the flexible backing can be polyimide (PI), polyethylene (PE), polypropylene (PP), polystyrene (PS), polyethylene glycol terephthalate, (PET), or polyethylene naphthalate two formic acid glycol ester (PEN). The polymeric materials exhibit excellent flexibility, low weight, impact resistance, and being suitable for flexible display panels. In this, polyimide can also realize excellent heat resistance and stability.

In the array substrate of some display panels, due to the influence of feedthrough effect, when the display panel gets luminous, an edge of the display pane is relatively brighter than a central zone. In an actual process of manufacturing, a thickness of film layer edge of an array substrate is thinner than a thickness of a film layer center. For example, when polyimide is used to make the base plate, the thickness of the film layer edge is thinner than the center by around 10%. According to the feedthrough formula:

$$Vft = Cgs(Vgh - Vgl)/(Cst + Clc + Cgs)$$

where Vft is feedthrough voltage; Cgs is gate-source parasitic capacitance; Cst is storage capacitance; Clc is liquid crystal capacitance; Vgh is voltage of gate driving line when set on; and Vgl is voltage of gate driving line when set off.

The feedthrough effect specifically indicates that the array substrate edge being thinner resulting from the manufacturing process causes the storage capacitance Cst of the edge zone being lowered. The lowering of the storage capacitance Cst causes increase of the feedthrough voltage Vft. Since a display panel sets a common voltage Vcom by referring to a central point of the array substrate, this would result in the common voltage of the edge zone deviating from Vcom, making the portion of the edge of the display panel relatively brighter.

Thus, in the array substrate 10 provided in an embodiment of the application, in at least a portion of the pixel units 101a that are adjacent to the base plate edge a, areas of the array electrodes 102 are gradually decreased in a direction from the base plate center b toward the base plate edge a. In this, the portion of the array electrodes 102 in which the areas are gradually decreased are arranged in a region of the display panel in which the brightness is relatively bright. If the areas of the array electrodes 102 are decreased, and then, the aperture ratios of the pixel units 101a are reduced. After the aperture ratios of the pixel units 101a are reduced, light transmission rate in an edge zone of the array substrate 10 can be lowered. As such, the portion of the base plate edge a of which light is relatively bright is made corresponding to the brightness of the base plate center b, thereby realizing the improvement on the nonuniformity of periphery displaying of the display panel.

Optionally, continuously referring to FIG. 1, the array substrate 10 comprises a display zone 10A and a non-display zone 10B. The non-display zone 10B is arranged to surround the display zone 10A. In this, the display zone comprises a first display sub-zone 101A and a second display sub-zone 102A. The second display sub-zone 102A is arranged in at least one side of the first display sub-zone 101A. In the second display sub-zone 102A, the array electrodes 102 to which different ones of the pixel units 101a correspond have areas that are gradually decreased in a direction from a base plate center b toward an edge c of the second display sub-zone 102A. Further, in FIG. 1, the second display sub-zone 102A being arranged to surround the first display sub-zone 101A is taken as an example for illustration.

Optionally, the second display sub-zone 102A has a width D that is from millimeters to 200 millimeters. Specifically, the width D of the second display sub-zone 102A can be 10 millimeters, 20 millimeters, 30 millimeters, 40 millimeters, millimeters, 60 millimeters, 70 millimeters, 80 millimeters, 90 millimeters, 100 millimeters, 110 millimeters, 120 millimeters, 130 millimeters, 140 millimeters, 150 millimeters, 160 millimeters, 170 millimeters, 180 millimeters, 190 millimeters, or 200 millimeters. The width D of the second display sub-zone 102A being from 10 millimeters to 200 millimeters indicates that in the edge zone of the display zone of the array substrate 10, in a region that is away from the edge by 10 millimeters to 200 millimeters, the array electrodes 102 are arranged in an area-varying arrangement. This is because that the issue of non-uniform film layer thickness of the array substrate 10 primarily occurs in the region that is away from the edge by 10 millimeters to 200 millimeters. According to different precision of manufacturing art, the film layer thinning region may be different, and thus, a limitation is imposed on the range of the width D of the second display sub-zone 102A, and specific area-varying width of the array electrodes 102 is adjusted according to the difference of specific display panels and difference of precision of manufacturing art, in order to obtain a display panel having the best displaying effect.

Continuously referring to FIG. 2, FIG. 2 provides an enlarged view of a portion of the second display sub-zone 102A of FIG. 1. Illustrated in FIG. 2 is the areas of the array electrodes 102 in the pixel units 101a are gradually decreased in a direction from the base plate center b toward the second display sub-zone edge c.

In other words, in the second display sub-zone 102A, the arrangement is made such that the areas of the array electrodes 102 in the pixel units 101a are gradually decreased in the direction from the base plate center b toward the base plate edge a.

Optionally, continuously referring to FIG. 2, in at least a portion of the pixel units 101a that are adjacent to the base plate edge a, the array electrodes 102 that correspond to different ones of the pixel units 101a have widths W that are identical, while lengths L of the array electrodes 102 are gradually decreased in a direction from the base plate center b toward the base plate edge a.

After the lengths of the array electrodes 102 are decreased, a wire laying space around the array electrodes 102 is increased, allowing arrangement of capacitors or other circuit components in the space that is saved in the length direction, to improve an operation efficiency of an array circuit. For example, after the lengths L have been decreased, capacitors can be connected to two sides of the array electrodes 102 in a second direction y, and the feedthrough formula may be applied to reduce the feedthrough voltage Vft to further improve the issue of non-uniform displaying of the display panel.

Figure 3:
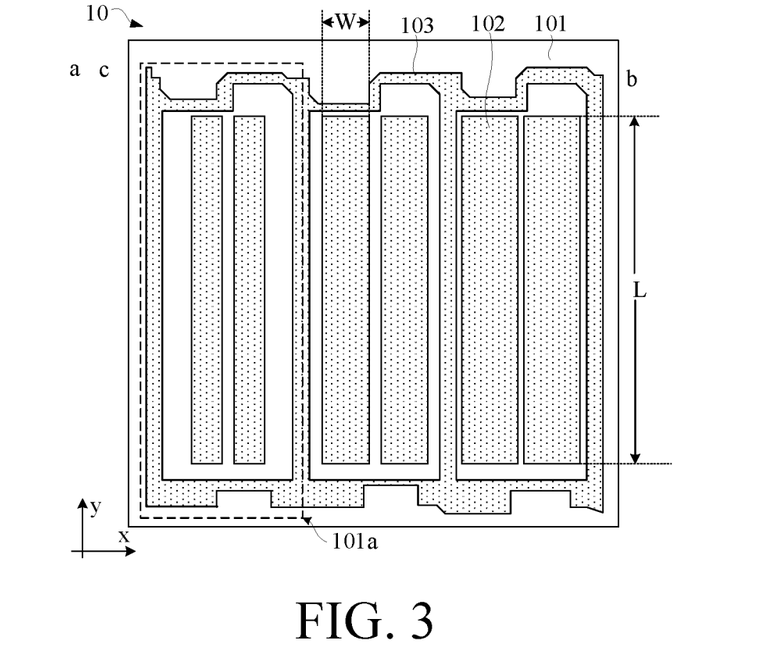
FIG. 3 is a schematic view showing, in an enlarged way, portion A of FIG. 1 provided in an embodiment of the application in a second form.

Optionally, referring to FIGS. 1 and 3, FIG. 3 is a schematic view showing, in an enlarged way, portion A of FIG. 1 provided in an embodiment of the application in a second form. In this, in at least a portion of the pixel units 101*a* that are adjacent to the base plate edge a, the array electrodes 102 that correspond to different ones of the pixel units 101*a* have lengths L that are identical, while widths W of the array electrodes 102 are gradually decreased from the base plate center b toward the base plate edge a.

Decreasing the widths of the array electrodes 102 provides a larger wire laying space for peripheral wiring, so that, on the one hand, can be ensured that, with the wiring width being not changed, the number of pixels can be increased and resolution can be improved. On the other hand, it can be ensured that with resolution being not changed, the width of peripheral wiring can be increased and the wiring resistance can be reduced.

Figure 4:
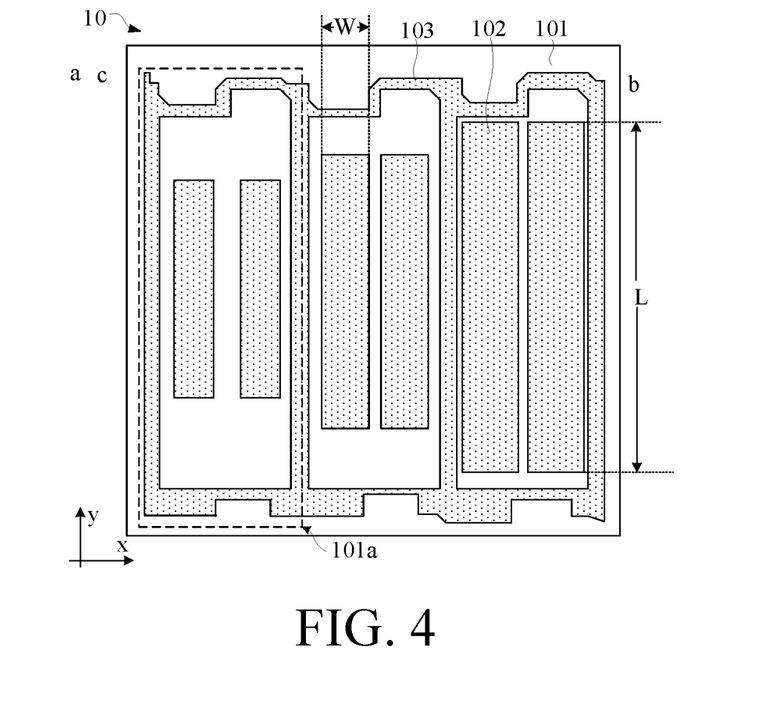
FIG. 4 is a schematic view showing, in an enlarged way, portion A of FIG. 1 provided in an embodiment of the application in a third form.

Optionally, referring to FIGS. 1 and 4, FIG. 4 is a schematic view showing, in an enlarged way, portion A of FIG. 1 provided in an embodiment of the application in a third form. In at least a portion of the pixel units 101*a* that are adjacent to the base plate edge a, the array electrodes 102 that correspond to different ones of the pixel units 101*a* have lengths L and widths W both of which are gradually decreased from the base plate center b toward the base plate edge a.

After both the lengths L and the widths W of the array electrodes 102 have been decreased, bettered circuits for other circuit components can be arranged on two sides of the array electrodes 102 in the length direction. Also, a wire laying space is increased in the width direction for increasing the width of peripheral wring and reduce the wiring resistance.

Optionally, in at least a portion of the pixel units 101*a* that are adjacent to the base plate edge a, the lengths L and/or the widths W of the array electrodes 102 in the pixel units 101*a* are gradually decreased in a direction from the base plate center b toward the base plate edge a by a difference of 0.1 micrometers to micrometers.

It is noted that the varying arrangement of the lengths L and/or the widths W can be selected according to a specific requirement for the display panel. The varying difference is selected as being from 0.1 micrometers to 0.5 micrometers. Specifically, the lengths L and/or the widths W of the array electrodes 102 in the pixel units 101*a* are gradually decreased in a direction from the base plate center b toward the base plate edge a by a difference of 0.1 micrometers, 0.15 micrometers, micrometers, 0.25 micrometers, 0.3 micrometers, 0.35 micrometers, 0.4 micrometers, 0.45 micrometers, or 0.5 micrometers.

Measurements conducted in experiments indicate that the film thickness difference of the array substrate 10 is basically ranging from 10 angstroms to 100 angstroms. Thus, under such a film thickness difference, an adaptive design is made in respect of variation gradient of the array electrodes 102 according to the difference of film thickness. For example, when the film thickness difference is relatively small, the widths W or the lengths L of the array electrodes can be decreased by a gradient of 10 micrometers. When the film thickness difference is relatively greater, the widths W or the lengths L of the array electrodes can be decreased by a gradient of 200 micrometers.

It is appreciated that within the tolerable range of manufacturing art, a relatively small difference of variation should be adopted to arrange the array electrodes 102. Since the nonuniformity of film thickness of the array substrate 10 is extremely minute, selecting a relatively small value for the difference of variation of the array electrodes can provide a more matched compensation for film thickness nonuniformity, and does not incur new issue of brightness nonuniformity resulting from a relatively large gradient of pixel aperture ratios. It is noted that the arrangements of the array electrodes 102 provided according to the embodiments of the application are such that the varying region is the region from 10 millimeters to 200 millimeters. Thus, a relatively large gradient of variation can be selected for a variation region that has a relatively large range, in order to reduce the difficulty of manufacturing. A relatively small gradient of variation is selected for a variation region that has a relatively small range, for improving the bettered effect of displaying for the display panel.

In this, in FIGS. 2-4, wiring 103 is provided in a periphery of the array electrodes 102. The wiring 103 can be a data line, a scan line, or other wiring on the array substrate 10. In the embodiments of the application, the wiring 103 may represent a data line and a scan line, and an intersected arrangement of the wiring 103 may delimit the pixel units 101*a*

Figure 5:
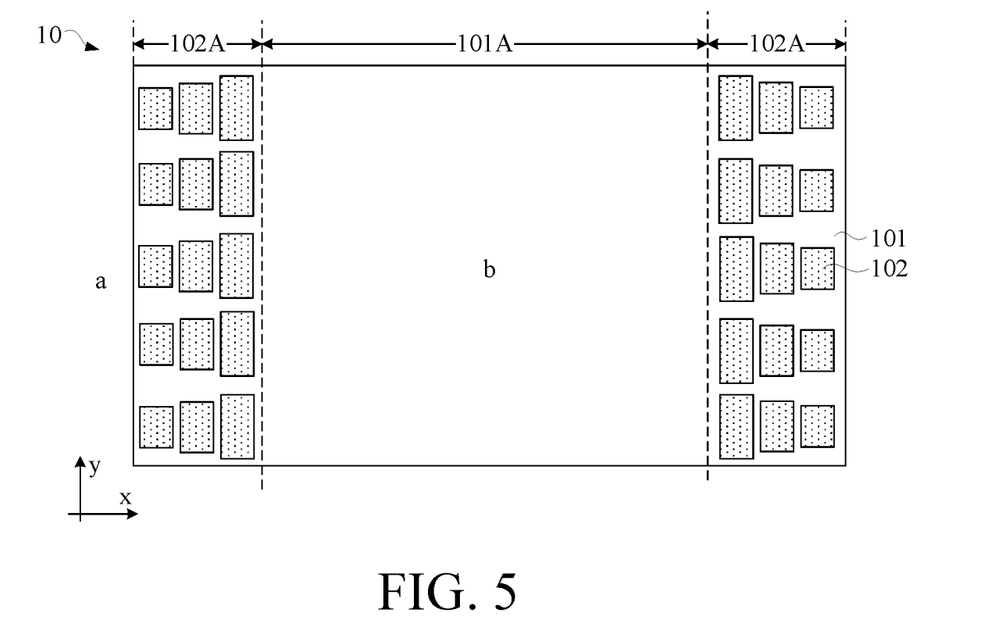
FIG. 5 is a schematic view showing an array electrode arrangement of an array substrate provided in an embodiment of the application in a first form.

Optionally, referring to FIG. 5, FIG. 5 is a schematic view showing an array electrode arrangement of an array substrate provided in an embodiment of the application in a first form. FIG. 5 schematically illustrates an arrangement of array electrodes 102, and a scale of the base plate 101 and the array electrodes 102 is processed for exaggeration, and the scale shown in FIG. 3 does not impose any limitation to the embodiments of the application.

It is appreciated that FIG. 5 provides an example for illustration, in which a second display sub-zone 102A is arranged on two sides of a first display sub-zone 101A. The second display sub-zone 102A may also be possibly arranged on only one side of the first display sub-zone 101A.

Optionally, the second display sub-zone 102A is arranged on two sides of the first display sub-zone 101A. In this, areas of the array electrodes 102 are gradually decreased from the base plate center b to an edge of the second display sub-zone 102A, and the second display sub-zone edge c refers to an edge of the second display sub-zone 102A in which the array electrodes 102 are arranged. In the second display sub-zone 102A, since the issue of nonuniform film thickness of the array substrate 10 is severer in a long edge than in the short edge, the second display sub-zone 102A can be selectively arranged on two sides of the first display sub-zone 101A in a long-edge direction of the array substrate 10, and the areas of the array electrodes 102 are gradually decreased from the base plate center b toward the second display sub-zone edge c in an edge zone along the long edge of the array substrate 10 to improve the issues of nonuniform displaying resulting from nonuniform film thickness of the array substrate.

Figure 6:
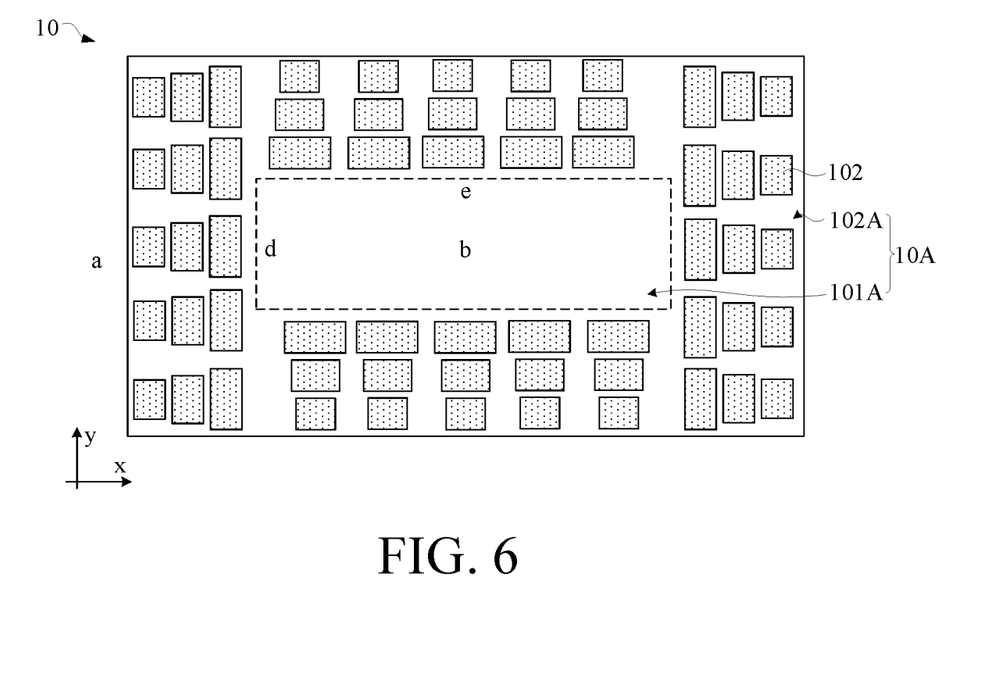
FIG. 6 is a schematic view showing an array electrode arrangement of an array substrate provided in an embodiment of the application in a second form.

Specifically, referring to FIG. 6, FIG. 6 is a schematic view showing an array electrode arrangement of an array substrate provided in an embodiment of the application in a second form. The embodiment illustrated in FIG. 6 is different from the embodiment illustrated in FIG. 3 in that the second display sub-zone 102A is at least arranged on a first side d and a second side e of the first display sub-zone 101A. The first side d and the second side e intersect with each other. In the second display sub-zone 102A arranged in the first side d, the areas of the array electrodes 102 corresponding to different ones of the pixel units 101*a* are gradually decreased in a direction from the base plate center b toward the first side d. In the second display sub-zone 102A arranged in the second side e, the areas of the array electrodes 102 corresponding to different ones of the pixel units 101a are gradually decreased in a direction from the base plate center b toward the second side e.

Figure 7:
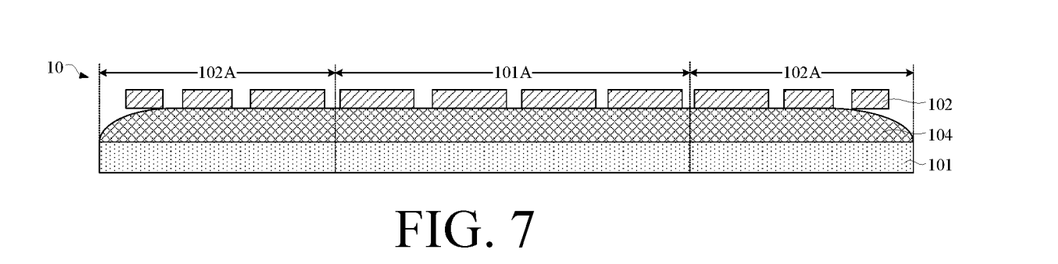
FIG. 7 is a schematic view showing a second structure of an array substrate provided in an embodiment of the application.

Optionally, referring to FIG. 7, FIG. 7 is a schematic view showing a second structure of an array substrate provided in an embodiment of the application. The array substrate 10 further comprises an insulation layer 104. The insulation layer 104 is disposed on the base plate 101. The array electrodes 102 are arranged on one side of the insulation layer 104 that is away from the base plate 101.

Optionally, the insulation layer 104 can be a gate insulation layer, an interlayer insulation layer, or a passivation layer. On the array substrate 10, such insulation film layers are often arranged as an entire surface and thus, it is even easier to cause the issues of thickness nonuniformity in an edge zone. For example, in a manufacturing process, the film thickness of the gate insulation layer is thinner at an edge than at a center by around 10%.

It is noted that FIG. 7 only shows the insulation layer 104 and the array electrodes 102 arranged on the base plate 10. There are other film layers arranged on the base plate 10, such as a gate electrode layer, a source-drain layer, and a planarization layer. Such other film layers on the base plate and assembly thereof are techniques that are familiar to artisans of the field, and no repeated description will be provided herein.

Figure 8:
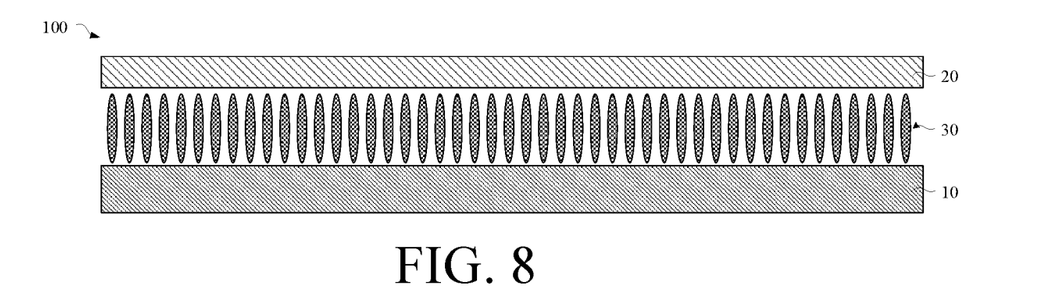
FIG. 8 is a schematic view showing a structure of a display panel provided in an embodiment of the present invention.

Correspondingly, the embodiments of the application also provide a display panel. Referring to FIG. 8, FIG. 8 is a schematic view showing a structure of a display panel provided in an embodiment of the present invention. The display panel 100 comprises an array substrate 10, an opposite substrate 20, and a liquid crystal layer 30. The array substrate 10 is the array substrate 10 provided in the above description. The opposite substrate 20 and the array substrate 10 are arranged opposite to each other. The liquid crystal layer 30 is disposed between the array substrate 10 and the opposite substrate 20.

In this, the array substrate 10 comprises a base plate 101, a light shielding layer arranged on the base plate 101, a buffer layer arranged on the base plate and covering the light shielding layer, an active layer, a gate insulation layer, and an electrode layer sequentially stacked on the buffer layer, and an interlayer dielectric layer located on the buffer layer and covering the active layer, the gate insulation layer, and the gate electrode. The active layer comprises a channel zone and a source zone and a drain zone located on two sides of the channel zone, a source and a drain located on the interlayer dielectric layer, the source and the drain being electrically connected with the source zone and the drain zone, respectively. The source and the drain are covered by a planarization layer provided thereon. A specific film layer arrangement of the array substrate is not illustrated in the drawings, and the array substrate 10 may further comprise other structures. The structure and of the array substrate 10, and specific arrangement thereof, are common technical solutions in the field, and repeated description will be omitted.

It is noted that the application does not impose limitation to a structure that forms a thin-film transistor in the array substrate 10, and the thin-film transistor can be a top-gate thin-film transistor or a bottom-gate thin-film transistor, or may alternatively be a dual-gate thin-film transistor or a single-gate thin-film transistor. The specific structure of the thin-film transistor will not be further described in the application.

In this, the array electrodes 102 can be common electrodes or pixel electrodes of a display panel. For example, the array electrodes 102 may serve as common electrodes arranged in the pixel units 101a to regulate a deflection direction of the liquid crystal layer.

A detailed description has been provided above for a backlight driving circuit and a liquid crystal display device provided in embodiments of the application. Specific examples are involved in the disclosure for expounding the principle of and the ways of embodying the application. The description of the embodiments provided above is only for helping understand the method of the application and the core idea thereof; and further, for skilled artisans of the field, alterations in respect of the specific ways of embodiment and scope of application may be made based on the idea of the application. In summary, the contents of disclosure should not be construed as limiting to the application.

What is claimed is:

1. An array substrate, comprising:
a base plate, wherein the base plate is provided thereon with multiple pixel units; and
multiple array electrodes, wherein at least one of the array electrodes is correspondingly disposed in one of the pixel units, wherein in pixel units that are arranged in a direction from a base plate center toward a base plate edge, array electrodes corresponding to at least a portion of the pixel units have areas that are gradually decreased in the arrangement direction;
wherein the array substrate comprises a first display sub-zone and a second display sub-zone, the second display sub-zone being arranged on at least one side of the first display sub-zone; in the second display sub-zone, array electrodes corresponding to different ones of the pixel units have areas that are gradually decreased from the base plate center toward a second display sub-zone edge;
wherein the array electrodes are grouped in electrode groups corresponding to the pixel units and arranged along an area gradually decreasing direction of the array electrodes, each electrode group comprises at least two of the array electrodes, the areas of the array electrodes of each electrode group are equal, and the areas of the array electrodes in different ones of the electrode groups are different.

2. The array substrate according to claim 1, wherein the second display sub-zone is at least arranged on a first side and a second side of the first display sub-zone, the first side and the second side intersecting with each other; in the second display sub-zone arranged on the first side, array electrodes corresponding to different ones of the pixel units have areas that are gradually decreased from the base plate center toward the first side, and in the second display sub-zone arranged on the second side, array electrodes corresponding to different ones of the pixel units have areas that are gradually decreased from the base plate center toward the second side.

3. The array substrate according to claim 1, wherein the second display sub-zone has a width ranging from 10 millimeters to 200 millimeters.

4. The array substrate according to claim 1, wherein in at least a portion of the pixel units that are adjacent to the base plate edge, array electrodes corresponding to different ones of the pixel units have widths that are identical and lengths of the array electrodes are gradually decreased from the base plate center toward the base plate edge.

5. The array substrate according to claim 4, wherein in at least a portion of the pixel units that are adjacent to the base plate edge, the lengths of the array electrodes in the pixel units are gradually decreased from the base plate center toward the base plate edge by a difference between 0.1 micrometers and 0.5 micrometers.

6. The array substrate according to claim 1, wherein in at least a portion of the pixel units that are adjacent to the base plate edge, array electrodes corresponding to different ones of the pixel units have lengths that are identical and widths of the array electrodes are gradually decreased from the base plate center toward the base plate edge.

7. The array substrate according to claim 6, wherein in at least a portion of the pixel units that are adjacent to the base plate edge, the widths the array electrodes in the pixel units are gradually decreased from the base plate center toward the base plate edge by a difference between 0.1 micrometers and 0.5 micrometers.

8. The array substrate according to claim 1, wherein in at least a portion of the pixel units that are adjacent to the base plate edge, array electrodes corresponding to different ones of the pixel units have lengths and widths that are both gradually decreased from the base plate center toward the base plate edge.

9. The array substrate according to claim 8, wherein in at least a portion of the pixel units that are adjacent to the base plate edge, the length and the widths of the array electrodes in the pixel units are both gradually decreased from the base plate center toward the base plate edge by a difference between 0.1 micrometers and 0.5 micrometers.

10. The array substrate according to claim 1, wherein the array substrate further comprises an insulation layer, the insulation layer being arranged on the base plate, the array electrodes being arranged on one side of the insulation layer that is away from the base plate.

11. A display panel, comprising:
an array substrate the array substrate comprising:
a base plate, wherein the base plate is provided thereon with multiple pixel units; and
multiple array electrodes, wherein at least one of the array electrodes is correspondingly arranged in one of the pixel units, in pixel units that are arranged in a direction from a base plate center toward a base plate edge, array electrodes corresponding to at least a portion of the pixel units have areas that are gradually decreased in the arrangement direction;
an opposite substrate, wherein the opposite substrate and the array substrate are arranged opposite to each other; and
a liquid crystal layer, wherein the liquid crystal layer is arranged between the array substrate and the opposite substrate;
wherein the array substrate comprises a first display sub-zone and a second display sub-zone, the second display sub-zone is arranged on at least one side of the first display sub-zone; in the second display sub-zone, array electrodes corresponding to different ones of the pixel units have areas that are gradually decreased from the base plate center toward a second display sub-zone edge;
wherein the array electrodes are grouped in electrode groups corresponding to the pixel units and arranged along an area gradually decreasing direction of the array electrodes, each electrode group comprises at least two of the array electrodes, the areas of the array electrodes of each electrode group are equal, and the areas of the array electrodes in different ones of the electrode groups are different.

12. The display panel according to claim 10, wherein the second display sub-zone is at least arranged on a first side and a second side of the first display sub-zone, the first side and the second side mutually intersecting; in the second display sub-zone arranged on the first side, array electrodes corresponding to different ones of the pixel units have areas that are gradually decreased from the base plate center toward the first side, and in the second display sub-zone arranged on the second side, array electrodes corresponding to different ones of the pixel units have areas that are gradually decreased from the base plate center toward the second side.

13. The display panel according to claim 10, wherein the second display sub-zone has a width ranging from 10 millimeters to 200 millimeters.

14. The display panel according to claim 11, wherein in at least a portion of the pixel units that are adjacent to the base plate edge, array electrodes corresponding to different ones of the pixel units have widths that are identical and lengths of the array electrodes are gradually decreased from the base plate center toward the base plate edge.

15. The display panel according to claim 14, wherein in at least a portion of the pixel units that are adjacent to the base plate edge, the lengths of the array electrodes in the pixel units are gradually decreased from the base plate center toward the base plate edge by a difference between 0.1 micrometers and 0.5 micrometers.

16. The display panel according to claim 11, wherein in at least a portion of the pixel units that are adjacent to the base plate edge, array electrodes corresponding to different ones of the pixel units have lengths that are identical and widths of the array electrodes are gradually decreased from the base plate center toward the base plate edge.

17. The display panel according to claim 16, wherein in at least a portion of the pixel units that are adjacent to the base plate edge, the lengths of the array electrodes in the pixel units are gradually decreased from the base plate center toward the base plate edge by a difference between 0.1 micrometers and 0.5 micrometers.

18. The display panel according to claim 11, wherein in at least a portion of the pixel units that are adjacent to the base plate edge, array electrodes corresponding to different ones of the pixel units have lengths and widths that are both gradually decreased from the base plate center toward the base plate edge.

* * * * *